3,535,943
SCALE CHANGING GEAR MECHANISM
Kenneth Miller, Piedmont, and Harlan B. Merritt, San Francisco, Calif., assignors to the United States of America as represented by the Secretary of the Navy
Filed Dec. 5, 1968, Ser. No. 781,489
Int. Cl. F16h 27/00
U.S. Cl. 74—89.17                                    4 Claims

ABSTRACT OF THE DISCLOSURE

A scale changing mechanism for use with a radiac unit where the scale changing mechanism includes a six position range switch that drives a five position meter. This is achieved with a gear mechanism comprising a range switch gear, a meter gear, a rack, and a guide for holding the rack in contact with the gears. The switch gear is in engagement with one end of the rack and the meter gear is in engagement with the other end of the rack. The end of the rack that is engaged with the meter gear has a blank region where several rack teeth are removed. The meter gear has a blank region where several gear teeth are removed. The blank region in the rack functions to allow a one position rotation of the switch gear without movement of the meter gear whereas additional rotation of the switch gear results in rotation of the meter gear.

---

The invention described herein may be manufactured and used by or for the Government of the United States of America for governmental purposes without the payment of any royalties thereon or therefor.

The present invention relates to a radiac device and more particularly to a scale changing mechanism for a radiac device.

Radiac devices are typically used to measure gamma radiation and usually present a continuous display of both cumulative gamma dose and instantaneous gamma dose. In a nuclear war environment radiac devices provide essential information to military commands and can be a primary factor in making vital tactical decisions. For example, the timely implementation of adequate countermeasures after possible or actual radiological exposure may determine whether a given force will suffer serious casualties. Another type of radiac oriented action that may be a key military tactic in any protracted nuclear war is the successful management of the available dose pool, that is, the total acceptable dose per individual multiplied by the entire group being considered. Quantitative radiation measurements are of equal importance in peace time situations, ranging from controls required for industrial and laboratory operations to coping effectively with a nuclear accident.

The radiac unit with which the present invention is concerned has a six-position range switch which mechanically drives a five-position electrical meter. The range switch has an OFF position (first position), a BATTERY position (second position) and four radiation measuring positions (third, fourth, fifth, and sixth positions). When the range switch is in the OFF position all voltage is removed from the radiac meter circuit. When the range switch is in the BATTERY position, the meter functions as a voltmeter and is switched across all batteries to measure their voltage level. Since the last four positions of the five-position meter are required for radiation measurement, it is necessary for the meter to remain unchanged during the advance of the range switch from the OFF to the BATTERY position and to make incremental changes as the range switch is advanced through the next four positions.

This was previously achieved by chain-sprocket devices or cam mechanisms. In all cases the problem of exposing one meter scale to two positions of the range switch was solved by use of a spring in the drive system. However, as radiac devices are increasingly "ruggedized" the torque required to turn the rate meter shaft increased and the use of springs became unsatisfactory. This difficulty has been overcome by the gear mechanism of the present invention.

Briefly, the present invention consists of a gear mechanism comprising a range switch gear, a meter gear, a rack, and a guide for holding the rack in contact with the gears. The switch gear is in engagement with one end of the rack and the meter gear is in engagement with the other end of the rack. The end of the rack that is engaged with the meter gear has a blank region where several rack teeth are removed. The meter gear has a blank region where several gear teeth are removed. The blank space in the rack functions to allow rotation of the switch gear from the OFF to the BATTERY positions without corresponding movement of the meter gear. While the switch gear is in the OFF and BATTERY positions the meter gear is in the voltmeter position. However, when there is movement of the switch gear from the BATTERY to the third position (low sensitivity region) the meter gear is rotated to the low sensitivity position (second position). Rotation of the switch gear to the fourth, fifth and sixth position results in rotation of the meter gear to the third, fourth and fifth positions, respectively.

Other objects, advantages and novel features of the invention will become apparent from the following detailed description of the invention when considered in conjunction with the accompanying drawings wherein.

Figure 1:
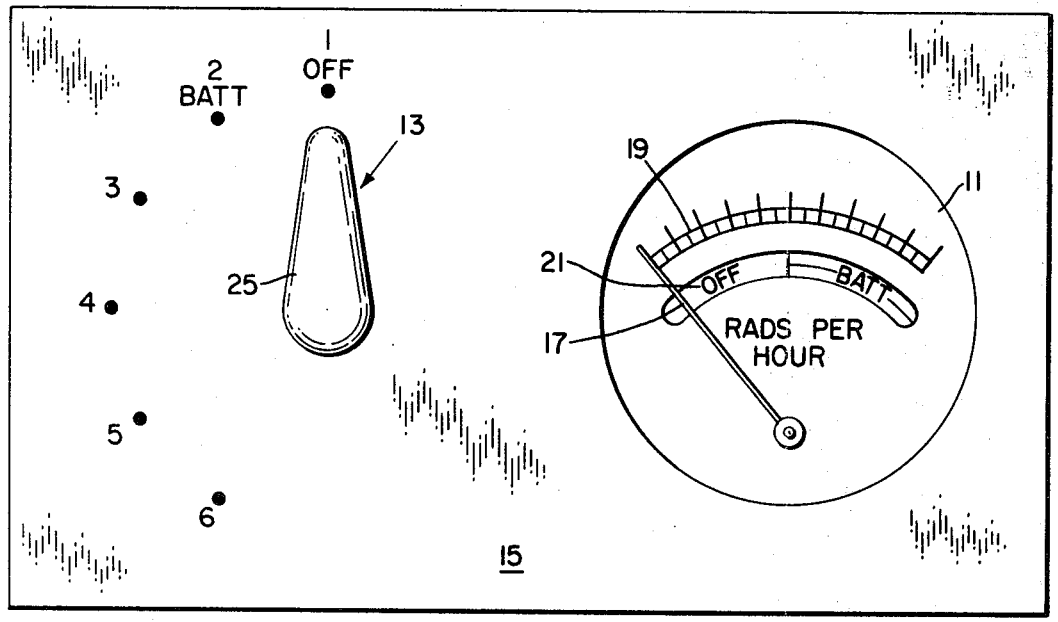
FIG. 1 is a drawing illustrating the face of the dose rate meter and range switch.

In FIG. 1 is shown the face of the dose rate meter 11 and the range switch selector arm 25 as mounted on face plate 15 of the radiac device. The dial of dose rate meter 11 has an indicator arm 17, a scale-division arc 19 for measuring advance of the indicator arm 17, and a changeable scale 21 indicating OFF and BATTERY in the position shown. Range switch 13 has a selector arm 25 and six positions comprising OFF (position 1), BATT (position 2) and positions 3, 4, 5, and 6. When the range switch is in the OFF position all voltage is removed from the radiac dose rate meter and other electrical circuits. When the range switch is in the BATT position the dose rate meter functions as a voltmeter and is switched across all batteries to measure their voltage level. Also when the range switch is in the BATT position the battery voltage is applied to all circuits. In accordance with the switching mechanism of the present invention the switching circuit in the radiac operates so that the meter is connected as a voltmeter in both the BATT and in the OFF positions. However, when range switch 13 is switched to the OFF position it prevents the radiac battery voltage from being applied to the dose rate meter.

When range switch 13 is in position 3 then it causes the switching circuit in the radiac to be in the low sensitivity range. In this low sensitivity range, a full scale reading on arc 19 will represent 10,000 rads per hour, the numbers being shown on scale 21. As range switch 13 is progressively moved through positions 4, 5 and 6, the sensitivity becomes progressively higher where at position 6 the dose rate meter will have maximum sensitivity. For example, full scale reading at positions 4, 5 and 6 will be 1,000, 100 and 10 rads per hour, respectively, which numbers will appear on changing scale 21.

It should be particularly noted that rate meter 11 is a five-position meter, which is the standard meter for radiac units, and position switch 13 is a six-position switch having the six previously described functions. Therefore, it is necessary for meter scale 21 to remain unchanged during the advance of range switch 13 from the OFF to the BATT positions and to make incremental changes as the range switch is advanced through the next four positions.

Figure 2:
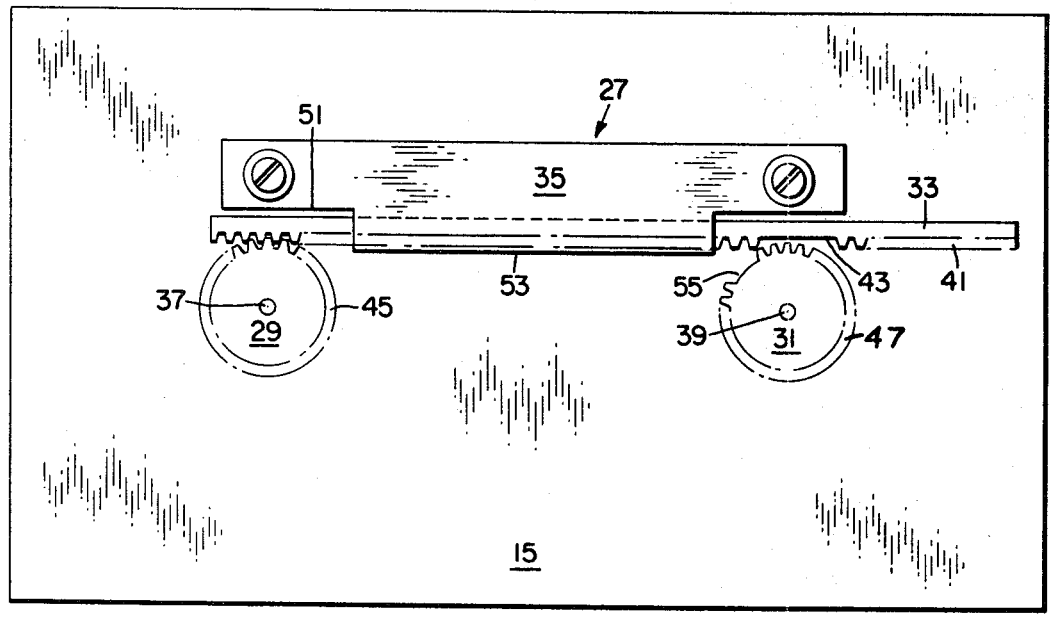
FIG. 2 is a drawing illustrating the gear mechanism of the present invention.

Referring now to FIG. 2 which illustrates gear mechanism 27 which is mounted on the back of face plate 15 or on a separate mounting plate, not shown: The principal components of gear mechanism 27 comprise switch gear 29, meter gear 31, rack 33 and guide 35. Switch gear 29 is rigidly attached to switch shaft 37 which is connected to selector arm 25 of range switch 13. Meter gear 31 is rigidly attached to meter shaft 39 of meter 11. Meter shaft 39 is connected to a five-position scale in meter 11 which changes the characteristics and sensitivity of meter 11 as previously described. Rack 33 has a plurality of gear teeth 41 that extend throughout its length except for a blank region 43 where five teeth are removed in the illustrated embodiment. The rack teeth 41 of rack 33 are held in engagement with gear teeth 45 of switch gear 29 and gear teeth 47 of meter gear 31 by guide 35 which permits only longitudinal movement of rack 33. Guide 35 is mounted on face plate 15 and the upper surface of rack 33 slides along surface 51 and lateral movement of the rack is prevented by downwardly extending lip 53. In the embodiment illustrated meter gear 31 has a blank region 55 where two teeth have been removed. In this embodiment switch gear 29 has 30 gear teeth and meter gear 31 has 28 gear teeth (2 teeth having been removed from a 30 tooth gear) and there is 30 degrees of rotation between each of the positions of range switch 13.

The number of teeth removed from rack 33 to form blank region 43 is determined by the formula $$N_R = \frac{N_g}{6}$$

where $N_R$ is the number of teeth removed and $N_g$ is the number of teeth in each of gears 29 and 31. This formula applies for gears of 20 degree pressure angle and for a meter and switch each having 30 degree position increments. The pressure angle of the gears and rack may be 14½ degrees and the diametral pitch may be 72, 64, 48, or 32 depending upon the space available and the angular increment of the switch.

OPERATION

In FIGS. 3 through 8 are respectively illustrated the position of the gear mechanism of the present invention in the OFF, BATT 3, 4, 5 and 6 positions. The zero reference position of switch gear 29 is indicated by a "dot" on that gear, the zero reference position of meter gear 31 is indicated by a "dot" at the most clockwise position of blank region 55 and the zero reference position of rack 33 is indicated by the "dot" at the rightmost position of blank region 43. In each of these figures the dotted line indicates the starting position of zero degree reference position of switch gear 29, meter gear 31, and rack 33. The broken lines in FIGS. 4, 5, 6, 7, and 8 indicate the positions switch gear 29, meter gear 31 and rack 33 occupy during incremental rotation of switch gear 29.

Figure 3:
FIGS. 3 through 8 illustrate the operation of the gear mechanism of the present invention.

Referring now to FIG. 3, the gear mechanism 27 is in the OFF position where switch gear 29, meter gear 31 and rack 33 are in the zero positions as indicated by the dotted lines. In this position meter gear 31 is set so that dose rate meter 11 is electrically connected to register as a voltmeter. However, switch gear 29 is set so that no battery voltage is applied to the dose rate meter while it is in the OFF position.

Figure 4:

In FIG. 4 is illustrated the positions of switch gear 29, meter gear 31 and rack 33 when switch gear 29 has been rotated 30° to the ON position. When switch gear 29 is rotated counterclockwise 30° then rack 33 moves laterally to the left as distance equivalent to 30°. However, meter gear 31 will not rotate because blank region 43 moves past the teeth of meter gear 31 without engaging its gear teeth. The degree of motion, the size of blank region 43 and the number and size of the rack and gear teeth are selected so that rack tooth 57 (the initial rack tooth to the left of blank region 43) is in initial engagement with meter gear tooth 59 (the initial meter gear tooth to the right of blank region 55) when the gear mechanism is in the OFF position of FIG. 3 and rack tooth 61 (the initial rack tooth to the right of blank region 43) is in initial engagement with meter gear tooth 63 (four gear teeth clockwise of meter gear tooth 59) when in the ON position. It should be particularly noted that blank region 43 of rack 33 is formed by removing five rack teeth and that there is a rack motion equivalent to 2½ rack teeth or 30° from the OFF position (FIG. 3) to the BATT position (FIG. 4). In the BATT position meter gear 31 remains set as it was in the OFF position so that dose rate meter 11 is electrically connected to register as a voltmeter. However, in the ON position switch gear 29 has been rotated 30° and now switches the battery voltage to the dose rate meter which is reading as a voltmeter. Also the battery voltage is switched to the electrical circuits of the radiac units.

Figure 5:
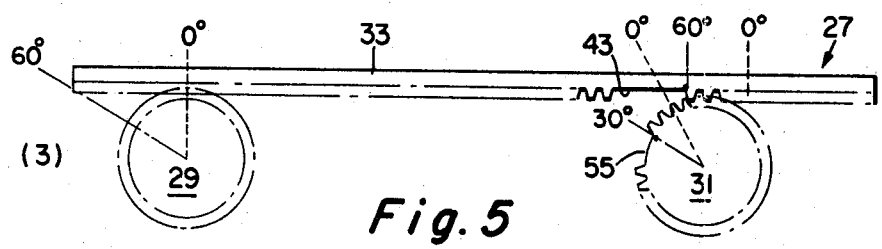

In FIG. 5 is illustrated the position of switch gear 29, meter gear 31 and rack 33 when switch gear 29 has been rotated to the third position or 60° from the OFF position. When switch gear 29 is rotated 60° counterclockwise from the OFF position to the thrid position then rack 33 moves laterally to the left a distance equivalent to 30° from the ON position or 60° from the OFF position as indicated. Since rack tooth 61 is in engagement with gear tooth 63 in the ON position meter gear will rotate 30° counterclockwise as indicated in FIG. 5. When meter gear 31 is rotated to this 30° position then dose rate meter is switched from the voltmeter connection to the low sensitivity position where gamma radiation of 10,000 rads per hour, for example, will provide full scale deflection of dose rate meter 11.

Figure 6:

In FIG. 6 is illustrated the position of switch gear 29, meter gear 31 and rack 33 when switch gear 29 has been rotated to the fourth position or 90° from the OFF position. When switch gear 29 is rotated 90° counterclockwise from the OFF position to the fourth position then rack 33 moves laterally to the left a distance equivalent to 30° from the third position or 90° from the OFF position. Since rack 33 and meter gear 31 are in engagement in the third position, meter gear 31 will rotate 30° counterclockwise to the 60° position as indicated in FIG. 6. When meter gear 31 is rotated to the 60° position than dose rate meter 11 is switched from the low sensitivity position (10,000 rads per hours) to an intermediate sensitivity position where gamma radiation of 1,000 rads per hour, for example, will provide full scale deflection of dose rate meter 11.

Figure 7:
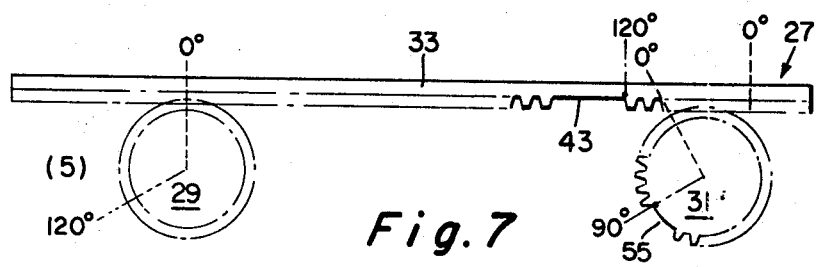

In FIG. 7 is illustrated the position of gear mechanism 27 when switch gear 29 has been rotated to the fifth position or 120° from the OFF position. When switch gear 29 is rotated 30° counterclockwise from the fourth position to the fifth position then rack 33 moves laterally to the left a distance equivalent to 30° from the fourth position or 120° from the OFF position. Since rack 33 and meter gear 31 are in engagement in the fourth position, meter gear 31 will rotate 30° counterclockwise which is 90° from the OFF position as illustrated in FIG. 7. When meter gear 31 is rotated to the 90° position, or to the fifth position of switch gear 29, then dose rate meter 11 is switched from the intermediate sensitivity position of (1,000 rads per hour) to the intermediate sensitivity position where gamma radiation of 100 rads per hour, for example, will provide full scale deflection of dose rate meter 11.

Figure 8:
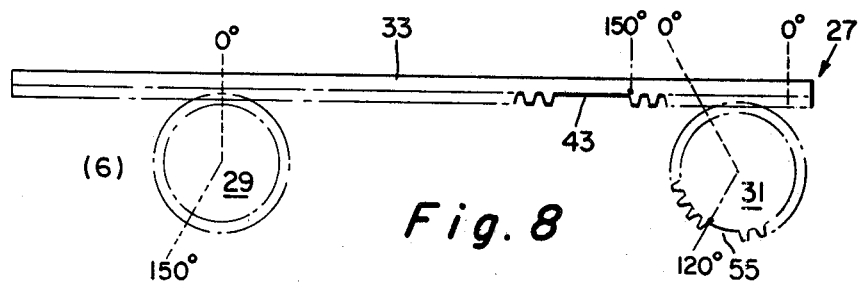

In FIG. 8 is illustrated the positions of gear mechanism 27 when switch gear 29 has been rotated to the sixth position or 150° from the OFF position as indicated. When switch gear is rotated 30° counterclockwise from the fifth position of FIG. 7 the rack moves laterally to the left a distance equivalent to 30° from the fifth position or 150° from the OFF position. Since rack 33 and meter gear 31 are in engagement in the fifth position, meter gear 31 will rotate 30° counterclockwise which is 120° from the OFF position as illustrated in FIG. 8. When meter gear 31 is rotated to the 120° position, or to the sixth position of switch gear 29, then dose rate meter 11 is switched from the intermediate sensitivity position of 100 rads per hour to the high sensitivity position where gamma radiation of 10 rads per hour, for example, will provide full scale deflection of dose rate meter 11.

When the gear rotation is clockwise rack 33 moves to the right and the above operation is reversed. FIG. 4 shows a part of the operation which is important to the reliability of the invention. After clockwise rotation from the third or FIG. 5 position, rack tooth 61 contacts meter gear tooth 64 at the addendum (outer tip) only, after having driven meter gear 31 through 29° from position 3. When switch gear 29 is turned 30° clockwise to the OFF or FIG. 3 poistion, rack tooth 57 contacts meter gear tooth 59, driving meter gear 31 1° clockwise. This 1° rotation has no electrical effect on the meter, but accomplishes two mechanical functions. First it locks meter gear 31 firmly in the OFF position by contact between rack tooth 57 and meter gear tooth 59 and, secondly, it provides clearance between rack tooth 61 and gear tooth 64 so that at the next counterclockwise action there will be no interference between rack tooth 61 and gear tooth 64 at the addendum.

Blank region 55 of meter gear 31 is provided so that there will be no interference between rack tooth 57 and the gear teeth removed to form the blank region when the device is switched from the BATT or FIG. 4 position to the OFF or FIG. 3 position.

What is claimed is:
1. A gear mechanism comprising:
 (a) a circular gear having gear teeth;
 (b) a longitudinally extending rack having rack teeth that cooperate with said gear teeth;
 (c) one end of said rack having a blank region formed by removal of one or more rack teeth;
 (d) said gear being in engagement with said one end of said rack;
 (e) means for longitudinally moving said rack;
 (f) said circular gear includes a blank region formed by removal of one or more teeth from said circular gear; and
 (g) whereby when said rack is being moved longitudinally said gear is rotated by said rack when said gear teeth are in engagement with said rack teeth but said gear remains stationary when said blank region of said rack is adjacent said gear teeth said blank region of said circular gear assures positive engagement of said gear teeth and said rack teeth when the rack teeth forming each end of the blank region of said rack are in engagement with said gear teeth.

2. The device of claim 1 wherein:
 (a) the gear tooth forming one end of the blank region of said gear is in engagement with the rack tooth forming one end of the blank region of said rack when said rack is at the end of its travel in one direction.

3. The device of claim 2 wherein:
 (a) said circular gear is a meter gear for driving a five position meter;
 (b) said means is a switch gear having six positions; and
 (c) a guide for holding said rack in engagement with said meter gear and said switch gear.

4. The device of claim wherein:
 (a) rotation of said switch gear from a first to a second position causes rotation of said meter gear from a first to a second position;
 (b) rotation of said switch gear from said second position to a third position permits said meter gear to remain in said second position; and
 (c) sequential rotation of said switch gear to higher position causes sequential rotation of said meter gear to higher position.

References Cited

UNITED STATES PATENTS

| | | | |
|---|---|---|---|
| 1,726,876 | 9/1929 | Asbury. | |
| 2,922,505 | 1/1960 | De Buigne. | |
| 195,638 | 9/1877 | Nichols | 74—422 |
| 1,150,785 | 8/1915 | Mouton et al. | 74—435 |
| 2,857,697 | 10/1950 | Schutt et al. | 74—89.17 |
| 2,875,636 | 3/1959 | Harbaugh | 74/435 |
| 2,974,905 | 3/1961 | Rumsey | 74—435 |

WESLEY S. RATLIFF, JR., Primary Examiner

U.S. Cl. X.R.

74—435